United States Patent [19]

Fellows et al.

[11] Patent Number: 4,948,526

[45] Date of Patent: Aug. 14, 1990

[54] AZEOTROPE-LIKE COMPOSITIONS OF PENTAFLUORODIMETHYL ETHER AND MONOCHLORODIFLUOROMETHANE

[75] Inventors: Barbara R. Fellows, Kenmore; Earl A. E. Lund, West Seneca; Ian R. Shankland, Williamsville, all of N.Y.

[73] Assignee: Allied-Signal Inc., Morris Township, Morris County, N.J.

[21] Appl. No.: 412,752

[22] Filed: Sep. 26, 1989

[51] Int. Cl.$^5$ .......................... C11D 7/30; C11D 7/50
[52] U.S. Cl. .......................... 252/69; 252/67; 252/162; 252/364; 252/DIG. 9; 62/114
[58] Field of Search ................. 252/162, 364, DIG. 9, 252/67, 69; 62/114; 203/67

[56] References Cited

U.S. PATENT DOCUMENTS

| | | | |
|---|---|---|---|
| 2,101,993 | 12/1937 | Fleischer | 62/178 |
| 2,641,579 | 6/1953 | Benning | 252/67 |
| 3,362,188 | 1/1968 | Eiseman | 62/112 |
| 3,922,228 | 11/1975 | Hutchinson | 252/67 |
| 4,041,148 | 8/1977 | Simons | 424/45 |
| 4,303,536 | 12/1981 | Orfeo | 252/67 |

OTHER PUBLICATIONS

R. C. Downing, "Fluorocarbon Refrigerants Handbook", 17-43, 139-160, Prentice-Hall, 1988.

*Primary Examiner*—Paul Lieberman
*Assistant Examiner*—Kathleen Markowski
*Attorney, Agent, or Firm*—Colleen D. Szuch; Jay P. Friedenson

[57] ABSTRACT

Azeotrope-like compositions of penetafluorodimethyl ether and monochlorodifluoromethane useful for heating and cooling applications.

12 Claims, No Drawings

AZEOTROPE-LIKE COMPOSITIONS OF PENTAFLUORODIMETHYL ETHER AND MONOCHLORODIFLUOROMETHANE

FIELD OF THE INVENTION

This invention relates to azeotrope-like compositions of pentafluorodimethyl ether and monochlorodifluoromethane. These mixtures are useful as refrigerants for heating and cooling applications.

BACKGROUND OF THE INVENTION

Fluorocarbon based fluids have found widespread use in industry for refrigeration, air conditioning and heat pump applications.

Vapor compression is one form of refrigeration. In its simplest form, vapor compression involves changing the refrigerant from the liquid to the vapor phase through heat absorption at a low pressure and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes the refrigerant to vaporize. The vapor formed is then removed by means of a compressor in order to maintain the low pressure in the evaporator. The temperature and pressure of the vapor are then raised through the addition of mechanical energy by the compressor. The high pressure vapor then passes to the condenser whereupon heat exchange with a cooler medium, the sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluoromethane and chlorofluoroethane derivatives have gained widespread use in refrigeration applications including air conditioning and heat pump applications owing to their unique combination of chemical and physical properties. The majority of refrigerants utilized in vapor compression systems are either single component fluids or azeotropic mixtures. Single component fluids and azeotropic mixtures are characterized as constant boiling because they exhibit isothermal and isobaric evaporation and condensation. The use of azeotropic mixtures as refrigerants is known in the art. See, e.g., R. C. Downing, "FLUOROCARBONS REFRIGERANTS HANDBOOK", pp. 139–158, Prentice-Hall, 1988, and U.S. Pat. Nos. 2,101,993 and 2,641,579.

Fluoro-ethers, such as pentafluorodimethyl ether, are known materials and certain members of this class of compounds have been disclosed as potentially useful refrigerants in U.S. Pat. Nos. 3,362,180 and 3,922,228. The aerosol propellants of U.S. Pat. No. 4,041,148 have also been disclosed as potentially useful refrigerants.

Azeotrope or azeotrope-like compositions are desired because they do not fractionate upon boiling or evaporation. This behavior is desirable because in the previously described vapor compression equipment with which these refrigerants are employed, condensed material is generated in preparation for cooling or for heating purposes and, unless the refrigerant composition is constant boiling, i.e. is azeotrope-like, fractionation and segregation will occur upon evaporation and condensation and undesirable refrigerant distribution may act to upset the cooling or heating.

Non-azeotropic mixtures have been disclosed as refrigerants, see, e.g., U.S. Pat. No. 4,303,536, but have not found widespread use in commercial applications even though the ability of non-azeotropic refrigerant blends to exhibit improved thermodynamic performance has often been discussed in the literature. See, e.g., T. Atwood, "NARBS - The Promise and the Problem", American Society of Mechanical Engineers, Winter Annual Meeting, paper 86-WA/HT-61, 1986 and M. O. McLinden et al., "Methods for Comparing the Performance of Pure and Mixed Refrigerants in the Vapor Compression Cycle", *Int. J. Refrig.* 10, 318 (1987). Because non-azeotropic mixtures may fractionate during the refrigeration cycle, they require certain hardware changes. The added difficulty in charging and servicing refrigeration equipment is the primary reason that non-azeotropic mixture have been avoided. The situation is further complicated if an inadvertent leak in the system occurs during such use or service. The composition of the mixtures could change, affecting system pressures and system performance. Thus, if one component of the non-azeotropic mixture is flammable, fractionation could shift the composition into the flammable region with potential adverse consequences.

The art is continually seeking new fluorocarbon based azeotrope-like mixtures which offer alternatives for refrigeration and heat pump applications. Currently, of particular interest, are fluorocarbon based refrigerants which are considered to be environmentally acceptable substitutes for the fully halogenated chlorofluorocarbons. The latter are implicated in causing environmental problems associated with the depletion of the earth's protective ozone layer. Mathematical models have substantiated that partially halogenated species, such as monochlorodifluoromethane ($CHClF_2$, HCFC-22), and non-chlorine containing compounds, like pentafluorodimethyl ether, will not adversely affect atmospheric chemistry being negligible contributors to stratospheric ozone depletion in comparison to the fully halogenated species.

The substitute materials must also possess those properties unique to the CFC's including chemical stability, low toxicity, non-flammability, and efficiency in-use. The latter characteristic is important, for example, in refrigeration applications like air conditioning where a loss in refrigerant thermodynamic performance or energy efficiency may produce secondary environmental effects due to increased fossil fuel usage arising from an increased demand for electrical energy. Furthermore, the ideal CFC refrigerant substitute would not require major engineering changes to conventional vapor compression technology currently used with CFC refrigerants.

Accordingly, it is an object of this invention to provide azeotrope-like compositions based on pentafluorodimethyl ether and monochlorodifluoromethane which are useful in cooling and heating applications.

It is another object of the invention to provide environmentally acceptable, chemically stable, non-flammable and energy efficient refrigerants.

Other objects and advantages of the invention will become apparent from the following description.

DETAILED DESCRIPTION OF THE INVENTION

In accordance with the invention, novel azeotrope-like compositions have been discovered comprising pentafluorodimethyl ether and monochlorodifluoromethane. The azeotrope-like compositions comprise from about 5 to about 50 weight percent pentafluorodimethyl ether and from about 95 to about 50 weight percent monochlorodifluoromethane which have a vapor pressure of about 73.8 psia (509 kPa) at 32° F. (0° C.). These compositions are azeotropic-like because they are constant-boiling, i.e., exhibit essentially constant vapor pressure versus composition and essentially identical liquid and vapor compositions over the aforementioned compositional ranges.

In a preferred embodiment of the invention, the azeotrope-like compositions comprise from about 20 to about 40 weight percent pentafluorodimethyl ether and from about 80 to about 60 weight percent monochlorodifluoromethane which have a vapor pressure of about 73.8 psia (509 kPa) at 32° F. (0° C.).

Our best estimate of the true azeotropic composition is about 28.9 weight percent pentafluorodimethyl ether and about 71.1 weight percent monochlorodifluoromethane, which has a vapor pressure of about 73.8 psia (509 kPa) at 32° F. (0° C.).

The term "azeotrope-like" is used herein for mixtures of the invention because in the claimed proportions, the compositions of pentafluoroethane and difluoromethane are constant boiling or essentially constant boiling.

All compositions within the indicated ranges, as well as certain compositions outside the indicated ranges, are azeotrope-like, as defined more particularly below.

Both pentafluorodimethyl ether and monochlorodifluoromethane are nonflammable at one atmosphere pressure and ambient temperature using the ASTM E-681 method as specified in the American Society of Heating, Refrigerating and Air-Conditioning Engineers (ASHRAE) Standard 34. The azeotrope-like compositions of the present invention were also found to be nonflammable using the same method.

From fundamental principles, the thermodynamic state of a fluid is defined by four variables: pressure, temperature, liquid composition, and vapor composition, or P-T-X-Y, respectively. An azeotrope is a unique characteristic of a system of two or more components where X and Y are equal at the stated P and T. In practice this means that the components cannot be separated during a phase change, and therefore are useful in the cooling and heating applications described above.

For the purposes of this discussion, by azeotrope-like composition is intended to mean that the composition behaves like a true azeotrope in terms of its constant boiling characteristics or tendency not to fractionate upon boiling or evaporation. Thus, in such systems, the composition of the vapor formed during evaporation is identical or substantially identical to the original liquid composition. Hence, during boiling or evaporation, the liquid composition, if it changes at all, changes only slightly. This is to be contrasted with non-azeotrope-like compositions in which the liquid and vapor compositions change substantially during evaporation or condensation.

If the vapor and liquid phases have identical compositions, then it can be shown, on a rigorous thermodynamic basis, that the boiling point versus composition curve passes through an absolute maximum or an absolute minimum at this composition. If one of the two conditions, identical liquid and vapor compositions or a minimum or maximum boiling point, are shown to exist, then the system is an azeotrope, and the other condition must follow.

One way to determine whether a candidate mixture is azeotrope-like within the meaning of this invention, is to distill a sample thereof under conditions (i.e. resolution—number of plates) which would be expected to separate the mixture into its separate components. If the mixture is a non-azeotrope or non-azeotrope-like, the mixture will fractionate, i.e. separate into its various components with the lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, i.e. it is not part of an azeotropic system.

An equivalent method for determining whether a candidate mixture is azeotrope-like is to determine whether the boiling point versus composition curve passes through a maximum or minimum. Azeotropes which possess a minimum boiling point must also possess a maximum in the vapor pressure curve at the same composition; as these blends exhibit positive deviations from Raoult's Law they are termed positive azeotropes. Similarly, those azeotropes which show a maximum boiling point must exhibit a minimum in the vapor pressure curve and are termed negative azeotropes owing to the negative deviations from Raoult's Law.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at differing pressures, the composition of a given azeotrope will vary at least slightly as does the boiling point of the composition. Thus, an azeotrope of A and B represents a unique type of relationship but with a variable composition depending on the temperature and/or pressure. As is readily understood by persons skilled in the art, the boiling point of an azeotrope will vary with the pressure.

Accordingly, another way of defining azeotrope-like within the meaning of this invention is to state that such mixtures exhibit vapor pressures within about ±3 psia (21 kPa) at 32° F. (0° C.) of the vapor pressure of the most preferred compositions disclosed herein (about 73.8 psia (509 kPa) at 32° F. (0° C.)). The preferred compositions exhibit vapor pressures within about ±2 psia (14 kPa) at 32° F. (0° C.).

In one process embodiment of the invention, the azeotrope-like compositions of the invention may be used in a method for producing heat which comprises condensing a refrigerant containing the azeotrope-like compositions in the vicinity of the body to be heated and thereafter evaporating the refrigerant.

In another process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

The pentafluorodimethyl ether and monochlorodifluoromethane components of the novel azeotrope-like compositions of the invention are known materials. Preferably they should be used in sufficiently high purity so as to avoid the introduction of adverse influences upon the constant boiling properties of the system.

It is known in the art that ether may exhibit the undesirable characteristic of forming peroxides especially when exposed to sun light or other radiation or stored for long periods of time. Furthermore, certain of the peroxides produced from decomposition of the ether are explosive and may be detonated by a shock. The art has recognized that certain stabilizers or anti-oxidant additives can be used to inhibit the decomposition of ether into the peroxide. Examples of such materials are alkyl or aryl phosphites such as diphenyl phosphite, triphenyl phosphite, tri-iso-octyl phosphite, di-octyl phosphite, and tri-iso-decyl phosphite, phenols such as 2,6-diethyl phenol, 2,4,6-triethyl phenol, 2,6-dipropyl phenol, and 2,4,6-tripropyl phosphite, and unsaturated hydrocarbons like cis and trans 4-methyl-2-pentene, cis and trans 2-hexene, 2-ethyl-1,3-butadiene, 1,2-pentadiene, cis and trans 1-hexene, and di-isobutylene. It is contemplated that such stabilizers may be combined with the azeotrope-like compositions of this invention.

It should be understood that the present compositions may include additional components so as to form new azeotrope-like compositions. Any such compositions are considered to be within the scope of the present invention as long as the compositions are essentially constant boiling and contain all the essential components described herein.

The present invention is more fully illustrated by the following non-limiting Examples.

EXAMPLE 1

This example shows that pentafluorodimethyl ether and monochlorodifluoromethane form an azeotrope. The region of constant vapor pressure versus composition is used to define the constant boiling or azeotrope-like composition range.

Vapor pressure measurements were performed by preparing mixtures of pentafluorodimethyl ether and monochlorodifluoromethane gravimetrically in an approximately 150 cubic centimeter vessel, equipped with a magnetically driven stirrer and a 0–300 psia (2068 kPa) pressure transducer accurate to ±0.2%. The vessel was submerged in a constant temperature bath controlled to within ±0.05° F. (0.03° C.). The vapor pressure measurement was recorded once thermal equilibrium was attained. This procedure was repeated for different compositions of pentafluorodimethyl ether and monochlorodifluoromethane. Table 1 summarizes the results of these experiments.

Interpolation of the data listed in Table I indicates that the vapor pressure remains essentially constant to within 2 psia (14 kPa) from about 5 weight percent to about 50 weight percent pentafluorodimethyl ether, i.e. this composition range is essentially constant boiling or azeotrope-like. The absolute maximum in the vapor pressure curve proves the existence of an azeotrope.

EXAMPLE 2

This example shows that azeotrope-like pentafluorodimethyl ether and monochlorodifluoromethane blends have certain performance advantages compared to other refrigerants which are currently used in certain refrigeration cycles.

TABLE I

| Weight Percent pentafluorodimethyl ether | Vapor Pressure | |
|---|---|---|
| | at 32° F. (0° C.) psia (kPa) | at 77° F.(25° C.) psia (kPa) |
| 0.0 | 72.5 (499.8) | 152.0 (1048.0) |
| 4.9 | 72.8 (501.9) | 152.9 (1054.9) |
| 12.7 | 73.4 (505.9) | 153.7 (1059.6) |
| 18.0 | 73.8 (508.8) | 154.4 (1064.4) |
| 24.8 | 73.8 (508.8) | 154.6 (1065.9) |
| 33.9 | 73.0 (503.0) | 154.1 (1062.5) |
| 47.0 | 72.6 (500.6) | 153.1 (1055.6) |
| 100.0 | 59.0 (406.8) | 123.0 (848.0) |

The theoretical performance of a refrigerant at specific operating conditions can be estimated from the thermodynamic properties of the refrigerant using standard refrigeration cycle analysis techniques. See, e.g., R. C. Downing, "Fluorocarbon Refrigerants Handbook", Chapter 3, Prentice-Hall, 1988. The coefficient of performance (COP) is a universally accepted measure, especially useful in representing the relative thermodynamic efficiency of a refrigerant in a specific heating or cooling cycle involving evaporation or condensation of the refrigerant. In refrigeration engineering this term expresses the ratio of useful refrigeration to the energy applied by the compressor in compressing the vapor. The capacity of a refrigerant represents the volumetric efficiency of the refrigerant. To a compressor engineer this value expresses the capacity of a compressor to pump quantities of heat for a given volumetric flow rate of refrigerant. In other words, given a specific compressor, a refrigerant with a higher capacity will deliver more cooling or heating power.

We have performed this type of calculation for a medium to low temperature refrigeration cycle, where the condenser temperatures typically range from 100° F. to 140° F., and the evaporator temperatures range from −50° F. to −10° F. We have further assumed isentropic compression and a compressor inlet temperature of 65° F. (18.3° C.). Such calculations were performed for a 71.1/28.9 by weight blend of monochlorodifluoromethane and pentafluorodimethyl ether, as well as for R-502 and pure monochlorodifluoromethane. R-502 is an azeotropic blend which consists of monochlorodifluoromethane and chloropentafluoroethane, a fully halogenated chlorofluorocarbon. R-502 has been routinely used for medium to low temperature refrigeration applications. Monochlorodifluoromethane is also used as a refrigerant in refrigeration applications.

Table II lists the COP and capacity of the pentafluorodimethyl ether/monochlorodifluoromethane blend relative to that of R-502, as well as the COP and capacity of monochlorodifluoromethane relative to R-502, over a range of evaporator temperatures. In Table II the * indicates that COP and capacity are given relative to R-502.

TABLE II

| Evaporator Temperature (°F.) | pentafluorodimethyl ether/ monochlorodifluoromethane | | | |
|---|---|---|---|---|
| | Azeotrope | | Monochlorodifluoromethane | |
| | COP* | Capacity* | COP* | Capacity* |
| 100°F. Condensing Temperature | | | | |
| −50.0 | 1.022 | 0.91 | 1.011 | 0.91 |
| −40.0 | 1.025 | 0.92 | 1.015 | 0.92 |
| −30.0 | 1.022 | 0.93 | 1.017 | 0.93 |

TABLE II-continued pentafluorodimethyl ether/
monochlorodifluoromethane

| Evaporator Temperature (°F.) | Azeotrope | | Monochlorodifluoromethane | |
|---|---|---|---|---|
| | COP* | Capacity* | COP* | Capacity* |
| 100°F. Condensing Temperature | | | | |
| −20.0 | 1.027 | 0.94 | 1.023 | 0.94 |
| −10.0 | 1.031 | 0.95 | 1.027 | 0.95 |
| 140° F. Condensing Temperature | | | | |
| −50.0 | 1.088 | 0.98 | 1.096 | 1.00 |
| −40.0 | 1.095 | 0.99 | 1.103 | 1.01 |
| −30.0 | 1.093 | 1.00 | 1.100 | 1.02 |
| −20.0 | 1.090 | 1.01 | 1.103 | 1.03 |
| −10.0 | 1.099 | 1.02 | 1.110 | 1.05 |

*Relative to R-502

The data listed in this table show that, at a 100° F. condensing temperature, the pentafluorodimethyl ether/monochlorodifluoromethane azeotrope blend provides a modest improvement in COP compared to that attainable with R-502, with a slight decrease in refrigeration capacity. At the higher 140° F. condensing temperature, where the refrigeration system is under much more operational stress, the capacity of the azeotrope-like blend is essentially the same as that of R-502 while the COP of the azeotrope-like blend shows about a 10 percent improvement over the of R-502.

Table III lists the calculated compressor discharge temperature for the same cycle at the 100° F. condenser temperature. Lower compressor discharge temperatures are preferred in the art as excessively high discharge temperatures cause compressor reliability problems.

TABLE III

| Evaporator Temperature (°F.) | R-502 | Compressor Discharge Temperatures Pentafluorodimethyl ether/ monochlorodifluoromethane | monochlorodifluoromethane |
|---|---|---|---|
| −50 | 251 | 290 | 327 |
| −40 | 235 | 269 | 303 |
| −30 | 220 | 250 | 280 |
| −20 | 205 | 232 | 259 |
| −10 | 192 | 215 | 239 |

Although the pentafluorodimethyl ether/monochlorodifluoromethane azeotrope-like blend does produce higher discharge temperatures than R-502, the discharge temperatures are less than those achieved with monochlorodifluoromethane alone, i.e., the azeotrope-like blend offers improved (lower) discharge temperatures compared to monochlorodifluoromethane. Increasing the pentafluorodimethyl ether composition, up to the claimed azeotrope-like limit of about 50 weight percent, results in even lower compressor discharge temperature.

Having described the invention in detail and by reference to preferred embodiments thereof, it will be apparent that modifications and variations are possible without departing from the scope of the invention defined in the appended claims.

What is claimed is:

1. Azeotrope-like compositions consisting essentially of from about 5.0 to about 50.0 weight percent of pentafluorodimethyl ether and from about 95.0 weight percent to about 50.0 weight percent monochlorodifluoromethane which have a vapor pressure of about 73.8 psia at 32° F.

2. The azeotrope-like compositions of claim 1 consisting essentially of from about 20 weight percent to about 40.0 weight percent pentafluorodimethyl ether and from about 80.0 weight percent to about 60.0 weight percent monochlorodifluoromethane.

3. The azeotrope-like compositions of claim 1 consisting essentially of about 28.9 weight percent pentafluorodimethyl ether and about 71.1 weight percent monochlorodifluoromethane.

4. Azeotrope-like compositions of claim 1 wherein said compositions have a vapor pressure of about 73.8 ± about 3 psia at 32° F.

5. A method for producing refrigeration which comprises condensing a composition of claim 1 and thereafter evaporating said composition in the vicinity of a body to be cooled.

6. A method for producing heating which comprises condensing a composition of claim 1 in the vicinity of a body to be heated and thereafter evaporating said composition.

7. A method for producing refrigeration which comprises condensing a composition of claim 3 and thereafter evaporating the said composition in the vicinity of the body to be cooled.

8. A method for producing heating which comprises condensing a composition of claim 3 in the vicinity of a body to be heated and thereafter evaporating said composition.

9. A method for producing refrigeration which comprises condensing a composition of claim 5 and thereafter evaporating said composition in the vicinity of a body to be cooled.

10. A method for producing heating which comprises condensing a composition of claim 5 in the vicinity of a body to be heated and thereafter evaporating said composition.

11. A method for producing refrigeration which comprises condensing a composition of claim 7 and thereafter evaporating said composition in the vicinity of a body to be cooled.

12. A method for producing heating which comprises condensing a composition of claim 7 in the vicinity of a body to be heated and thereafter evaporating said composition.

* * * * *